United States Patent [19]
Garin et al.

[11] 3,863,072
[45] Jan. 28, 1975

[54] SEMICONDUCTOR LOCALIZATION DETECTOR

[75] Inventors: Arlette Garin, Gif-sur-Yvette; Bernard Waast, Cachan, both of France

[73] Assignee: Commissariat A L'Energie Atomique, Paris, France

[22] Filed: May 2, 1973

[21] Appl. No.: 356,588

[30] Foreign Application Priority Data
May 19, 1972 France............72.18205

[52] U.S. Cl............. 250/370, 250/371
[51] Int. Cl............. G01t 1/24
[58] Field of Search............. 250/370, 371

[56] References Cited
UNITED STATES PATENTS 3,110,806  11/1963  Denney et al.............. 250/371
3,225,198  12/1965  Mayer...................... 250/371
3,524,985  8/1970   Sayres..................... 250/371

*Primary Examiner*—Archie R. Borchelt
*Attorney, Agent, or Firm*—Lane, Aitken, Dunner & Ziems

[57] ABSTRACT

A semiconductor detector for the localization of particles or radioactive tracers and constituted by a wafer of doped semiconductor material, a metallic thin film being deposited by vacuum evaporation on the rear face of the wafer. Doping of the same type as the wafer is accomplished by ion bombardment through the film and at least two metallic contacts are deposited on the rear face after thermal annealing of the wafer.

10 Claims, 4 Drawing Figures

SEMICONDUCTOR LOCALIZATION DETECTOR

This invention relates to a method of construction of localization detectors and to the detectors which are obtained by said method.

The principle of semiconductor particle detectors is already known. There is produced either an intrinsic region or a region which is deserted by the carriers by subjecting this latter to a strong electric field and in which the incident particles generate hole-electron pairs. The resultant current serves to detect the presence of an incident particle. In the case of localization detectors, the rear face of the detector is constituted by a resistance element. By measuring a potential difference, for example, the position of the particle impact can be deduced therefrom. In other words, the detector constitutes a distributed-constant line which is characterized by the capacitance established by the geometrical dimensions of the detector and by the rear-face resistance.

Detectors of this type are already in existence. Two principal methods are employed for forming the rear-face resistance element:

In a first method, a layer of nickel-chromium alloy or of bismuth is deposited by evaporation so as to form the resistance element. This resistive layer is very delicate and oxidizes readily. Its resistance therefore varies in the course of time and the measurement which can be deduced therefrom is not reliable.

In a second method, a layer of non-depleted silicon is employed as a resistance element and retained within the thickness of the detector. It is known that the thickness of the depleted region is a function of $\sqrt{\rho \cdot V}$ ($\rho$ being the resistivity of the crystal, V being the voltage applied in order to form the depleted region). If the reverse current of the detector varies (either with temperature or with the vacuum pressure level), there is a variation in the voltage applied to the detector; in consequence, this results in a variation in thickness of the depleted region and therefore in the thickness of the nondepleted region. The thickness of the silicon layer which forms the resistance element is therefore different from one moment to another. Moreover, there can be irregularities of homogeneity within the silicon and these result in a major ballistic defect.

The precise object of the present invention is to provide a method of construction of semiconductor localization detectors and relates to the detectors which are obtained by means of said method and overcome the disadvantages mentioned in the foregoing.

The method of construction of semiconductor localization detectors essentially consists in carrying out on one face of a wafer of semiconductor material an ion bombardment through a metallic thin film deposited on said face so as to accomplish doping of the same type as that of the wafer of semiconductor material, in carrying out thermal annealing of said wafer, in depositing on said face at least two metallic contacts on each side of the resistance element obtained as a result of said ion implantation.

In a first alternative embodiment, a wafer of $n$-type semiconductor material is employed and a $p$-type thin layer is formed on one face of said wafer by surface barrier. The operations described above are carried out on the other face and a conductive metallic deposite is then applied on the $p$-type layer. There is applied between the metallic deposit of the front face and one of the metallic deposits of the rear face a reverse potential difference such that the entire $n$-type region is deserted by the charge carriers.

In a second alternative embodiment, the method essentially consists in starting from a crystal of $p$-type semiconductor material, in performing the operations described earlier and in carrying out on the front face a thermal diffusion of lithium so that after the usual migration of the lithium ions, there is obtained an $n$-type surface layer and a deep intrinsic layer.

It is therefore apparent that, in order to form the active portion of the detector, there is either an intrinsic region (second embodiment) in the case of detectors which have a thickness within the range of 2 mm and 1 cm and which therefore serve to detect the position of high-energy particles or alternatively, a potential surface barrier is formed by applying a reverse potential difference between the $p$-$n$ junction so as to create a deserted region (detectors having a thickness of less than 2 mm).

The device obtained as a result of the application of the first alternative embodiment of the method essentially comprises from the front face towards the rear face thereof a very thin conductive metallic film, a $p$-type layer of semiconductor material, a thick layer of $n$-type silicon and a thin layer of heavily doped $n$-type silicon which constitutes the resistance element and the metallic connections, means for applying a reverse potential difference between the metal coating of the front face and one of the metal coatings of the rear face.

The device obtained as a result of application of the method according to the second alternative embodiment essentially comprises from the front face to the rear face thereof a thin layer of $n$-type semiconductor material, a thick layer of said intrinsic material and a thin film of said heavily doped $p$-type material on which metallic contacts are applied.

In accordance with further advantageous properties, the detector can have the shape of a bar of substantial length and the metallic connections of the rear face are placed at each end of said bar. In accordance with another property, the detector can have the shape of a cylinder and the metallic contacts of the rear face are placed respectively at the center and at the periphery of said rear face in the form of a ring.

A better understanding of the invention will in any case be gained from a perusal of the description given hereinafter in connection with a number of embodiments of the invention which are given by way of example without any limitation being implied, reference being made to the accompanying drawings, in which.

Figure 1:
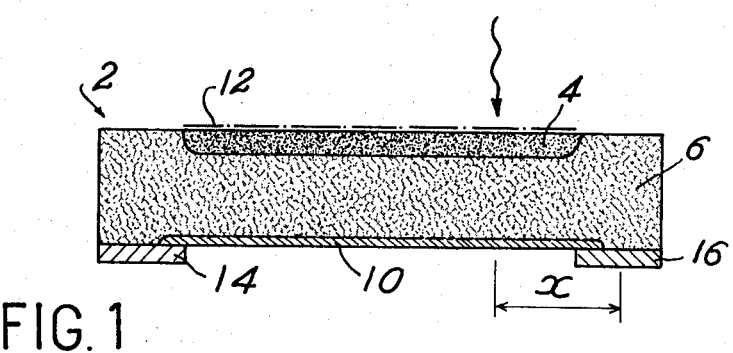
FIG. 1 shows a detector which is obtained by means of the first alternative embodiment of the method.

The sectional view of FIG. 1 shows the detector which is obtained by means of the first alternative form of the method according to the invention.

A high-resistivity $n$-type silicon wafer 2 is employed as starting material. A thin $p$-type layer 4 or so-called inversion layer is formed by any known means on the front face of the detector whilst the remaining portion 6 of the wafer 2 is n-type.

As a result of ion implantation, there is formed on the rear face of the detector a resistive thin film 8 obtained by heavy n-type doping. In order to perform said ion implantation, there is deposited by vacuum evaporation a thin film of aluminum having a thickness which is controlled in a highly accurate manner. Implantation of phosphorus ions is carried out through said metallic film; in other words, in a first step, the rear face of the detector is subjected to a bombardment of $10^{13}$ to $10^{15}$ phosphorus ions per $cm^2$, of energy within the range of 20 to 30 keV, whereupon thermal annealing of the wafer is carried out at a temperature below 600°C. There is then obtained a resistive layer 10 having a predetermined and constant thickness by virtue of the ion implantation through the aluminum film. A thin metallic film 12 is deposited by vacuum evaporation on the front face and therefore on the p-type layer 4. The metal employed is advantageously gold.

In the alternative embodiment which is shown in FIG. 1, the wafer 2 has the shape of a bar of substantial length. Electrical contacts 14 and 16 are deposited on the rear face of said wafer and at each end of this latter.

In order to activate the detector, a reverse direct-current potential is applied to the n-p junction, for example by connecting the electrical contact 14 to ground and by applying a potential −V to the contact 12, V being clearly dependent on the thickness of the detector in order to form the surface potential barrier. By way of indication, said potential difference can be of the order of 300 to 500 volts. The signal produced by the incident particles is collected between the contacts 14 and 16.

As they penetrate into the deserted region of the p-n junction, the particles form hole-electron pairs and this generates a current.

In order to measure the distance x between the point of impact and the electrical contact 16, it is possible:

either to measure the time which elapses between the instant of impact and the instant at which a pulse is collected on the contact 16 - in fact, the detector behaves in the same manner as a distributed-constant line characterized by the capacitance which is established by the geometrical dimensions of the detector and of the rear-face resistance element 10 or to compare the voltage collected at each electrical contact 14 and 16, each voltage being proportional to the distance between the point of impact and each electrical terminal.

Figure 2:
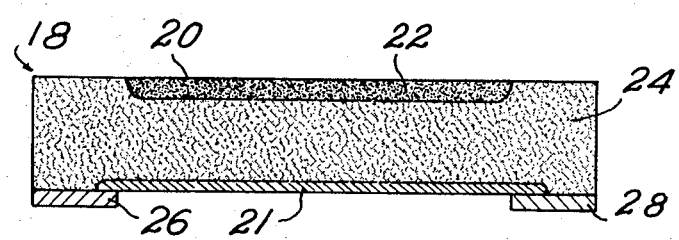
FIG. 2 shows a detector which is obtained by means of the second alternative embodiment of the method.

In FIG. 2, the detector which is obtained by means of the second alternative form of the method is also shown in cross-section.

A p-type silicon wafer 18 having a resistance of 1,000 Ω is employed as starting element. An implantation of boron ions 21 is performed through a thin film of gold on the rear face of the silicon wafer in the manner which was mentioned in the first alternative form of the method, the energy of the ions being the same, namely 20 to 30 keV.

A high-temperature diffusion of lithium is performed on the front face 20 of the wafer, thus forming the n-type region 22; this is followed by migration of the lithium into the region 24, which compensates for the initial p-type doping and thus forms an intrinsic region. This result is obtained by applying a suitable potential difference and an adequate temperature to the wafer. This process is well known. The operation involved in annealing the boron implantation is clearly performed at the same time as the diffusion of lithium.

Finally, a metallic contact 26 and 28 is deposited at each end of the rear face.

Determination of the point of impact of the particles on the detector is effected in accordance with one of the two means described earlier.

In the foregoing description, silicon has been taken as an example but it is readily apparent that other semiconductor materials could be employed without departing from the scope of the invention.

Figure 3:
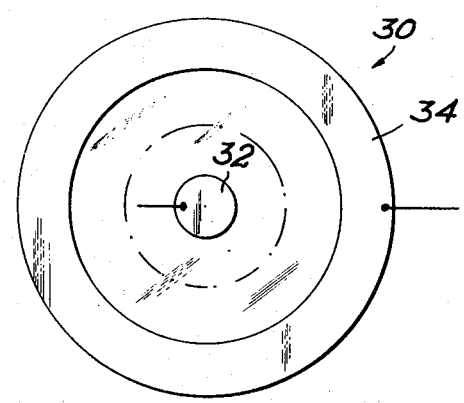
FIG. 3 shows one example of implantation of the electrical connections in the case of a detector having a cylindrical shape.

There is shown in FIG. 3 an alternative form of construction of the detector in accordance with the invention. Instead of having the shape of a bar and thus permitting localization along one axis of the detector, the detector 30 has the shape of a cylinder. The flat rear face of the detector which constitutes the resistive portion is provided with two electrical contacts obtained by deposition of metal. The first contact 32 has a small diameter and occupies the center of the flat face of the detector. The second contact 34 has the shape of a circular ring which is deposited on the periphery of the rear face of the detector 30. Localization can thus be carried out along the radius.

Figure 4:
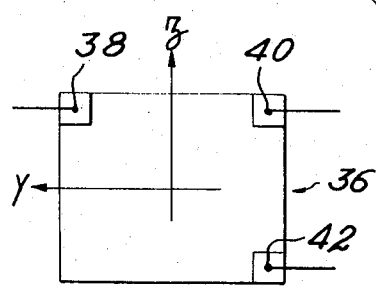
FIG. 4 shows one example of implantation of the electrical connections in the case of a detector having a parallelepipedal shape.

In a further alternative design shown in FIG. 4, the detector has the shape of a right-angled parallelepiped 36, the rear face of which is shown in the figure. Three metallic contacts 38, 40 and 42 are deposited at three of the vertices of the rectangle. By virtue of the electrical signals which are collected, it is possible by means of a computer to determine the position of impact of the incident particles along axes y and z which are parallel to the sides of said rectangle.

The advantages of the method and of the detector which is obtained by means of this method are very clearly apparent.

Recourse is had in part to a well-tried and conventional technology (migration of lithium or surface barrier).

The method of ion implantation through a metallic film makes it possible to obtain a resistive layer having a well-defined geometry. This is essential in order to ensure precise localization of the point of impact of incident particles.

These detectors have a wide range of applications. Mention can be made of the detection of particles in nuclear physics. Said detectors can also be advantageously employed in the medical or industrial field. In this case they serve as detectors for radioactive tracers introduced into the body to be tested.

What we claim is:

1. A detector constituted by:
    a wafer of semiconductor material comprising from the front face towards the rear face thereof a metallic thin film, a p-type layer, an n-type layer, a layer of constant thickness of semiconductor material heavily doped with n-type impurities and at least two electrical contacts,
    means for applying a reverse potential difference to the junction between said p-type layer and the adjacent n-type layer of said wafer.

2. A detector constituted by a wafer of semiconductor material comprising from the front face towards the rear face thereof a thin n-type layer, a thick intrinsic layer, a layer of constant thickness of semiconductor material heavily doped with p-type impurities and at least two electrical contacts.

3. A method of constructing a semiconductor localization detector comprising providing a doped semiconductor wafer having a front face and a rear face, providing a metallic film on said rear face, subjecting said rear face to ionic bombardment through said metallic film to achieve doping of the same type as said wafer, thermally annealing said wafer, and depositing at least two metallic contacts on said rear face.

4. A method as recited in claim 3 wherein said wafer is of n-type semiconductor material and further comprising forming on the front face of said wafer a thin p-type layer, depositing a metallic thin film on said p-type layer, and applying between the metallic film on said p-type layer and one of said metallic contacts on the rear face a reverse potential difference so that the entire p-type layer on said front face is deserted by charge carriers.

5. A method as recited in claim 3, wherein said wafer provided is of p-type silicon and further comprising effecting a diffusion of lithium into the front face of said wafer at the same time as said annealing and causing the lithium ions to migrate into said wafer so that a central layer of intrinsic semiconductor material results in said wafer.

6. A detector comprising a wafer of semiconductor material having a front face and a rear face and having a thin layer of one type conductivity at said front face of said wafer and a heavily doped layer of the opposite type conductivity of constant thickness at the back face of said layer, and at least two electrical contacts on said back face of said wafer.

7. A detector according to claim 6, wherein the wafer of semiconductor material has the shape of a bar of substantial length and wherein the electrical contacts are deposited at each end of the rear face of said bar.

8. A detector according to claim 6, wherein the detector is circular and wherein one of the metallic contacts of the flat rear face is placed at the center and wherein the other metallic contact is a circular ring deposited at the periphery of said face.

9. A detector according to claim 6, wherein said detector has the shape of a right-angled parallelepiped on the rear face of which are deposited three metallic contacts and each contact occupies one of the vertices of said face.

10. A detector according to claim 6, wherein the semiconductor material is silicon.

* * * * *